US009846973B2

(12) United States Patent
Buyanovskiy

(10) Patent No.: US 9,846,973 B2
(45) Date of Patent: *Dec. 19, 2017

(54) METHOD AND SYSTEM FOR VOLUME RENDERING COLOR MAPPING ON POLYGONAL OBJECTS

(71) Applicant: FOVIA, INC., Palo Alto, CA (US)

(72) Inventor: Georgiy Buyanovskiy, San Jose, CA (US)

(73) Assignee: FOVIA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,754

(22) Filed: Nov. 21, 2014

(65) Prior Publication Data

US 2015/0145864 A1    May 28, 2015

Related U.S. Application Data

(60) Provisional application No. 61/909,297, filed on Nov. 26, 2013.

(51) Int. Cl.
| | | |
|---|---|---|
| *G06T 15/08* | (2011.01) | |
| *G06T 15/50* | (2011.01) | |
| *G06T 19/20* | (2011.01) | |
| *G06T 15/04* | (2011.01) | |
| *G06T 15/87* | (2011.01) | |

(52) U.S. Cl.
CPC .............. *G06T 19/20* (2013.01); *G06T 15/04* (2013.01); *G06T 15/08* (2013.01); *G06T 15/87* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 6,072,505 A | 6/2000 | Piazza et al. | |
| 6,181,348 B1 | 1/2001 | Geiger | |
| 7,333,104 B2 | 2/2008 | Kase et al. | |
| 2001/0045955 A1* | 11/2001 | Oka | G06T 15/80 345/582 |
| 2002/0130854 A1 | 9/2002 | Perry et al. | |
| 2002/0130865 A1 | 9/2002 | Venkataraman | |
| 2004/0009459 A1* | 1/2004 | Anderson | G06F 19/3406 434/262 |

(Continued)

FOREIGN PATENT DOCUMENTS

EP    2549441 A1    1/2013

OTHER PUBLICATIONS

International Search Report & Written Opinion received for PCT Patent Application No. PCT/US2014/066860, dated Mar. 10, 2015, 8 pages.

(Continued)

*Primary Examiner* — Tapas Mazumder
(74) *Attorney, Agent, or Firm* — Dentons US LLP

(57) ABSTRACT

Processes and systems in computer enabled imaging for the mapping of volume rendering colors upon polygonal model objects applied to computer enabled volume rendering by means of mapping or encoding the color of volume rendering data upon polygonal model objects located inside volumetric data. Exemplary processes and systems including assigning the rendering result of voxels at or near the surface of the polygonal object.

13 Claims, 3 Drawing Sheets

(56) References Cited

U.S. PATENT DOCUMENTS

| | | | |
|---|---|---|---|
| 2004/0070584 A1 | 4/2004 | Pyo et al. | |
| 2004/0217956 A1 | 11/2004 | Besl et al. | |
| 2005/0143654 A1* | 6/2005 | Zuiderveld | G06T 15/08 600/443 |
| 2007/0012101 A1* | 1/2007 | Rottger | G06T 15/08 73/170.24 |
| 2009/0303236 A1* | 12/2009 | Buyanovskiy | G06T 15/08 345/426 |
| 2013/0271449 A1* | 10/2013 | Lee | G06T 13/40 345/419 |

OTHER PUBLICATIONS

International Preliminary Report on Patentability received for PCT Patent Application No. PCT/US2014/066860, dated Jun. 9, 2016, 7 pages.

Extended European Search Report (includes Supplementary European Search Report and Search Opinion) received for European Patent Application No. 14865963.4, dated Jun. 30, 2017, 8 pages.

* cited by examiner

METHOD AND SYSTEM FOR VOLUME RENDERING COLOR MAPPING ON POLYGONAL OBJECTS

CROSS-REFERENCE TO RELATED APPLICATIONS

This application claims priority to U.S. Provisional Patent Application Ser. No. 61/909,297, titled "METHOD AND SYSTEM FOR VOLUME RENDERING COLOR MAPPING ON POLYGONAL OBJECTS," filed on Nov. 26, 2013, which is incorporated by reference herein in its entirety for all purposes. This application is further related to U.S. patent application Ser. No. 14/548,175, entitled "VOLUME RENDERING COLOR MAPPING ON POLYGONAL OBJECTS FOR 3-D PRINTING," filed on Nov. 19, 2014, and U.S. patent application Ser. No. 14/296,092, and entitled "VOLUME RENDERING OF IMAGES WITH MULTIPLE CLASSIFICATIONS," filed on Jun. 4, 2014, both of which are incorporated herein by reference in its entirety.

BACKGROUND

This disclosure relates generally to computer graphics and depiction of images of objects using computer enabled imaging, and in one example to the representation of polygonal objects and color mapping.

Visualization of volumetric objects which are represented by three dimensional scalar fields is one of the most complete, realistic, and accurate ways to represent internal and external structures of real 3-D (three dimensional) objects. As an example, Computer Tomography (CT) digitizes images of real 3-D objects (such as inside the human body) and represents them as a discrete 3-D scalar field representation. MRI (Magnetic Resonant Imaging) is another system to scan and depict internal structures of real 3-D objects (e.g., portions of the human body). As another example, the petroleum industry uses seismic imaging techniques to generate a 3-D image volume of a 3-D region in the earth. As in the human body, some important structures, such as geological faults or salt domes, may be embedded within the region and are not necessarily on the exterior surface of the region.

Direct volume rendering is a well-known computer graphics technique for visualizing the interior of a 3-D region represented by such a 3-D image volume on a 2-D image plane, e.g., as displayed on a computer monitor. Hence a typical 3-D dataset is a group of 2-D image "slices" of a real object generated by the CT or MRI machine or seismic imaging. Typically the scalar attribute or voxel (volume element) at any point within the image volume is associated with a plurality of classification properties, such as color—red, green, blue—and opacity, which can be defined by a set of lookup tables. During computer rendering, a plurality of "rays" is cast from the 2-D image plane into the volume and the rays are each attenuated or reflected by the volume. The amount of attenuated or reflected ray "energy" of each ray is indicative of the 3-D characteristics of the objects embedded within the image volume, e.g., their shapes and orientations, and further determines a pixel value on the 2-D image plane in accordance with the opacity and color mapping of the volume along the corresponding ray path. The pixel values associated with the plurality of ray origins on the 2-D image plane form an image that can be rendered by computer software on a computer monitor. Computer enabled volume rendering as described here may use conventional volume ray tracing, volume ray casting, splatting, shear warping, or texture mapping.

In the CT example discussed above, even though a doctor using MRI equipment and conventional methods can arbitrarily generate 2-D image slices (cuts) of e.g., a human heart by intercepting the image volume in any direction, no single image slice is able to visualize the entire exterior surface of the heart. In contrast, a 2-D image generated through direct volume rendering of the CT image volume can easily display on an associated computer monitor the 3-D characteristics of the heart, which is very important in many types of cardiovascular disease diagnosis. Similarly in the field of oil exploration, direct volume rendering of 3-D seismic data has proved to be a powerful tool that can help petroleum engineers to determine more accurately the 3-D characteristics of geological structures embedded in a region that are potential oil reservoirs and to increase oil production significantly.

One of the most common and basic structures used to control volume rendering is the transfer function. Generally in mathematics, a transfer function is a representation of a linear time invariant dynamical system. In the context of computer graphics volume rendering, a transfer function defines the classification or translation of the original pixels of volumetric data (expressed as scalar values) to its representation on the associated computer monitor screen as a set of colors (or gray scale). Commonly used transfer functions convert the original (e.g., density) pixel data to a color—red, green, blue—and opacity classification. Hence each pixel as displayed has a color and opacity value defined from the original density or other data using a transfer function. The transfer function itself is mathematically, e.g., a simple ramp, a piecewise linear function or a lookup table. Note that the colors and opacity defined by the transfer function are arbitrary and not that of the actual depicted object. More generally, transfer functions in this context assign renderable (by volume rendering) optical properties to the numerical values (for each pixel) of the original dataset. The opacity function determines the contribution of each voxel to the final (rendered) image.

One of the most common needs of volume rendering applications is the extraction of traditional computer graphics polygonal objects from volumetric data. A polygon in computer graphics is a 2-D shape. Its position is defined by the XYZ coordinates of its vertices (corners). Volumetric data and polygonal object models representing the volumetric data are very different kinds of data in this field; volumetric data is a 3-D array of pixels while the well-known polygonal object model is a list of polygonal objects such as triangles or rectangles which are each represented by a grouping of correspondent XYZ vertices with assigned colors at each vertex.

Though direct volume rendering plays a key role in many important fields, traditional 3-D graphics is based on the expected polygonal object representation of 3-D objects. Thus, porting the visual information from volume rendered images to polygonal object models is a significant technical problem.

BRIEF SUMMARY

The mapping of volume rendering colors upon a polygonal object would be practically a valuable tool. For example, in the field of dentistry, fitting a dental implant to the densest part of the patient's jaw bone is critical to ensure proper implant location. In addition, avoiding the jaw's nerve channel is a vital requirement. Thus the color encoding of the MRI or CT image of the density of bone interfacing or crossing by the polygonal representation of the implant may allow the dental surgeon to have an interactive visual reference or feedback to ensure the best implant accommodation and location.

According to one embodiment described herein, an exemplary process includes exporting or porting the color information used for volume rendering upon the surface of a polygonal object located inside the volumetric data. In other words, projecting the volumetric color information created by volume rendering upon the surface of polygonal objects representing the volumetric data. One embodiment of the present invention is a method and system for mapping the output of a localized volume rendering operation to the vertices of a polygonal model object.

Exemplary processes and systems map or port the volume rendering data to the vertices of polygonal model located inside the volumetric data; particularly, the value of sample of scalar field at vertex location is used to acquire a correspondent red-green-blue color (RGB) component from Transfer Function look up table and to assign that color component to the vertex. The present processes and systems may then linearly interpolate the vertices' colors upon the surfaces of correspondent triangles, allowing one to visualize the color of the volumetric image intersecting with surfaces of the polygonal object located inside the volume.

One exemplary process and system includes mapping the transfer function color components (e.g., Red, Green, Blue) to the vertices of the corresponding polygonal model data. Particularly, the sample value of volumetric data from the XYZ point of each vertex location is used to acquire a correspondent red green blue color component from the transfer function and to assign it to the vertex color.

DETAILED DESCRIPTION

The aforementioned features and advantages of the invention as well as additional features and advantages thereof will be more clearly understood hereinafter as a result of a detailed description of embodiments of the invention when taken in conjunction with the drawings. The description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Figures 1, 2:
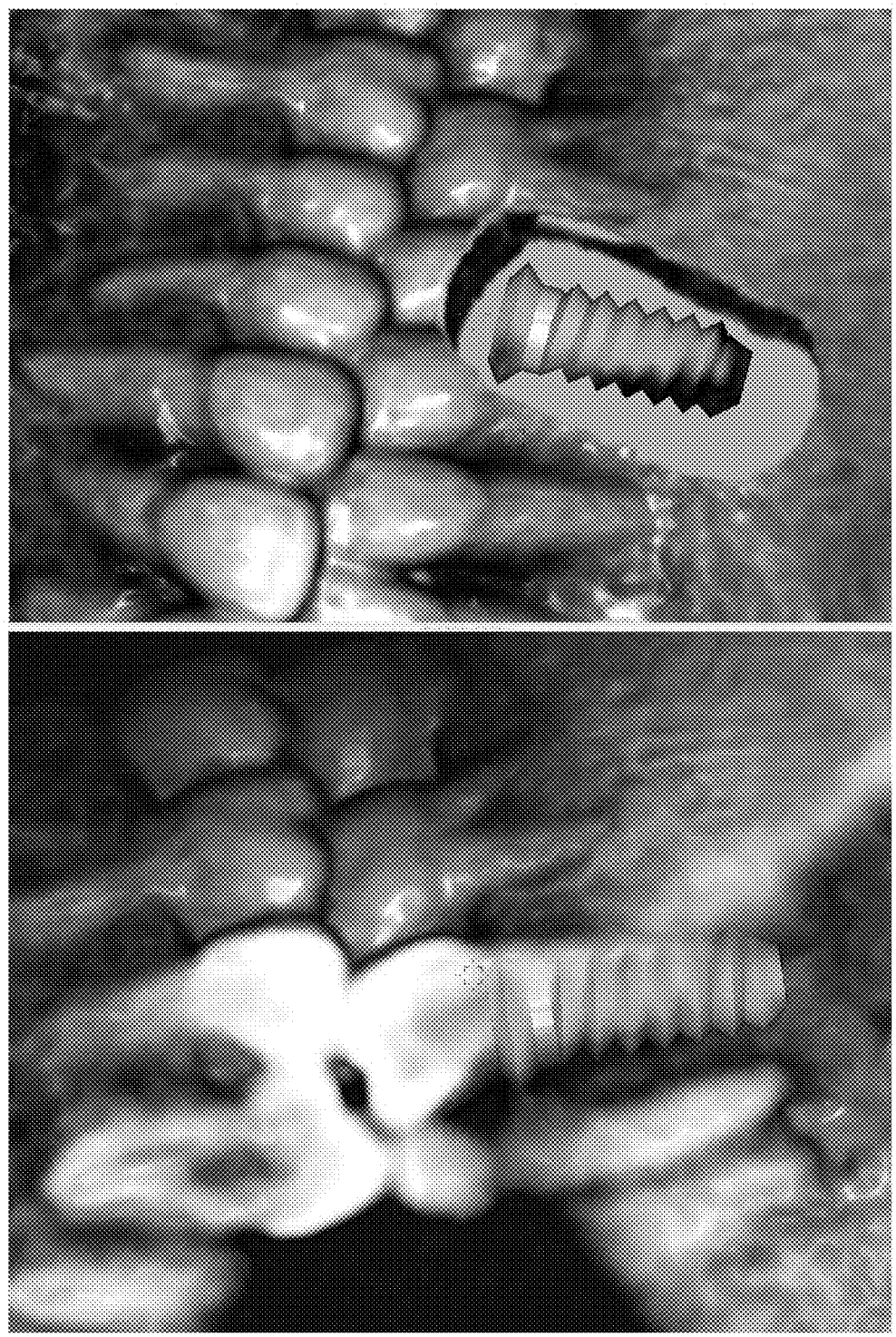
FIG. 1 illustrates color mapping from volumetric data to a surface of a polygonal object.
FIG. 2 illustrates FIG. 1 after the present mapping.

FIG. 1 (which normally would be in color) depicts a dental surgical field as an MRI type image with a patient's teeth, jaw bone, and implant (screw like device). In this particular case the surgical field image obtains its assigned colors from the bone-tissue density of the volumetric data, where lower density bones are assigned (encoded as) a darker color and higher density bone-tissue is encoded by a whiter color. The FIG. 1 image illustrates the polygonal object before the present mapping. Thus FIG. 1 illustrates the polygonal object inserted and/or interfaced with the scalar field, where the scalar field is represented by volume rendering. The surface of the polygonal object is interfaced and/or contacted by the surrounding scalar field.

The FIG. 2 image illustrates this object after the present mapping has been applied to the image, where the volumetric scalar field data is deleted immediately around the implant. This makes the result of the color mapping more visible. Normally in use, the work-flow of the associated system would display the non-obscured supplicate of the polygonal object in a separate window from different points of view or may be unwrapped as a 2-dimensional map of all surfaces of the polygonal object. Such a projection is updated in real time to allow the dental surgeon to observe in real time the bone density at all surfaces of the implant.

Note that embodiments of the invention extend beyond input CT or MRI obtained data to the application of any volumetric data to any polygonal data. Embodiments of this invention are not limited to this particular example which illustrates one case where it may be applied.

Figure 3:
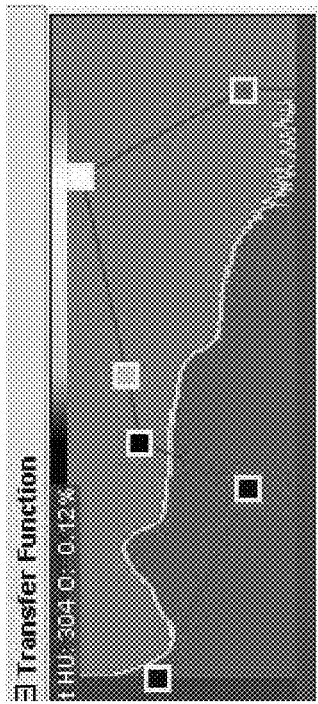
FIG. 3 illustrates the transfer function for FIG. 1, as used for the mapping.

The transfer function depicted graphically in FIG. 3 conventionally has as its horizontal axis the scalar volumetric pixel data values and as its vertical axis color and/or opacity. Further this transfer function is manipulatable conventionally by a user using a graphical user interface at its user control nodes.

The user (e.g., a dental surgeon), by manipulating the position of the dental implant (see FIGS. 1 and 2), may watch the image in real time (on an associated computer or other display) and thereby control the bone density that the implant interfaces with. This helps to position the implant in the densest bone-tissue which is one of the critical parameters to achieve a proper implant setup. This practical application of this method and system of course are not limited to this particular example, which only illustrates one case where it may be applied.

Figure 4:
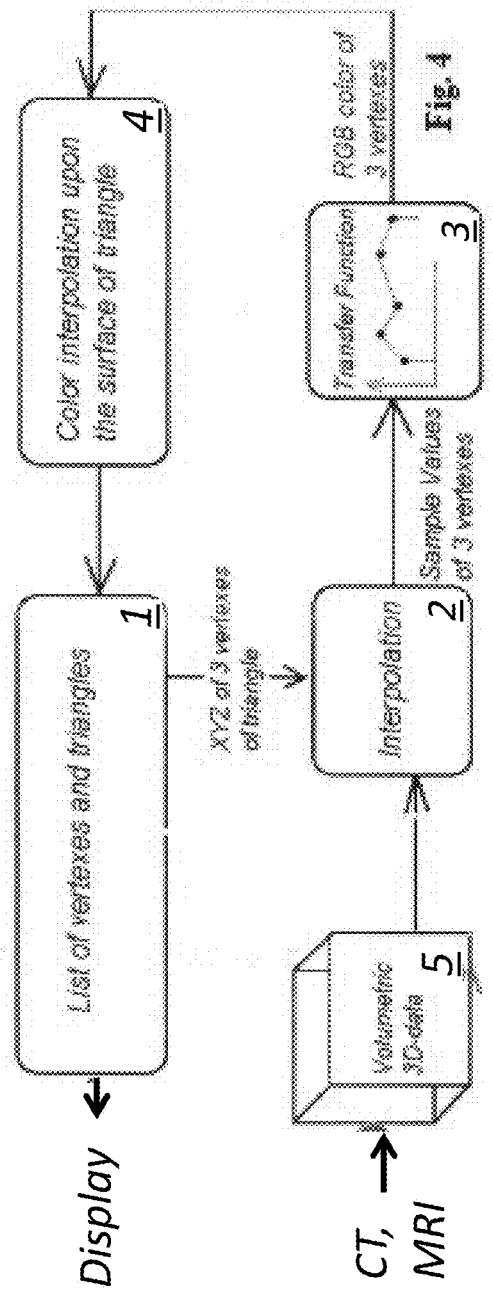
FIG. 4 depicts in a block diagram the present method and associated apparatus.

FIG. 4 depicts in a block diagram relevant portions of both the present method and the associated apparatus. Module 1 depicts the polygon object data structure (polygonal mesh) stored in computer readable memory as a list of vertices (conventional XYZ coordinates for each vertex) and the conventional associated list of triangles which is composed from the correspondent triplets of vertexes from the vertex list. Module 5 is the conventional volumetric data structure as stored in computer readable memory which is, e.g., conventionally a list of two dimensional slice images stacked into a three dimensional volume. This data is provided as described above from, e.g., an MRI or CT scanner or other data source, conventionally.

For purposes of this disclosure, the particular method of how the polygonal mesh data of module 1 is acquired is not important and may be any conventional method. Sometimes the polygonal surface-mesh lies along the item's (depicted object's) iso-surface. But this is a special case. If the polygonal object lies along the iso-surface it will be colorized uniformly. In some situations this may be useful, such as for prosthetic fitting. The transfer function (module 3) conventionally sets the correspondence of the volumetric data values of module 5 and the colorization of the correspondent volumetric image. Module 2 executes a conventional interpolation procedure to provide a sample value of volumetric data. This can be done by, e.g., conventional ray casting on the volumetric data.

Module 4 then executes the color interpolation upon the surface of each polygonal triangle (from module 1) based on the color of each triangle vertex. The result of module 4 thus modifies the polygonal data in module 1, for subsequent display. Module 4 performs color interpolation near each polygonal object vertex located at or near the surface of the item, where this data is conventionally stored in memory in module 1. By "near" here is meant adjacent or local, since the volumetric pixels do not lie exactly on the polygonal vertices. The method produces a RGB color vertex result to apply back to the otherwise conventional list of polygonal model vertices and triangles of module 1. The polygonal object data of module 1 as so modified by modules 2 to 4 is conventionally transmitted to a display. So the method applies the RGB color output of the volume rendering process to the color attribute of the vertex definition. Vertex definitions for a polygonal object can have many attributes, but for this process, three relevant exemplary attributes are location (XYZ), normal (XYZ), and color (RGB).

Note that the present method and system are not limited to medical imaging and are applicable to computer animation (for games, films, etc.) and other computer graphics techniques requiring polygonal object model data for the output but using volumetric data as the original data.

The present method in some embodiments performs its volume rendering (module 2) using a ray casting or other known method. Particularly, the value of sample of scalar field at vertex location is used to acquire a correspondent red-green-blue color (RGB) component from Transfer Function look up table and to assign that color component to the vertex.

In one implementation, the present method and apparatus to map the color of correspondent scalar field sample at vertex location (the relation of color and scalar field value is defined by Transfer Function look up table) upon the surface of a polygonal object inserted inside volumetric data is embodied in computer software (code or a program) to be executed on an otherwise conventional programmed computer or computing device.

This code may be a separate application program and/or embedded in the polygonal model representation. The input data-set (e.g., the CT data) to module 5 in FIG. 4 may be provided live (in real time from a CT or MRI scanner or other source) or from data storage, so the software may be resident in a standalone computer or in the computing portions of e.g. a CT or MRI scanner machine or other platform. The computer software itself (coding of which would be routine in light of this disclosure) may be encoded in any suitable program language and stored on a computer readable medium in source code or compiled form. The output image shown in FIG. 2 is typically also stored in a computer readable storage medium (memory) in the computing system prior to and after being displayed.

Figure 5:
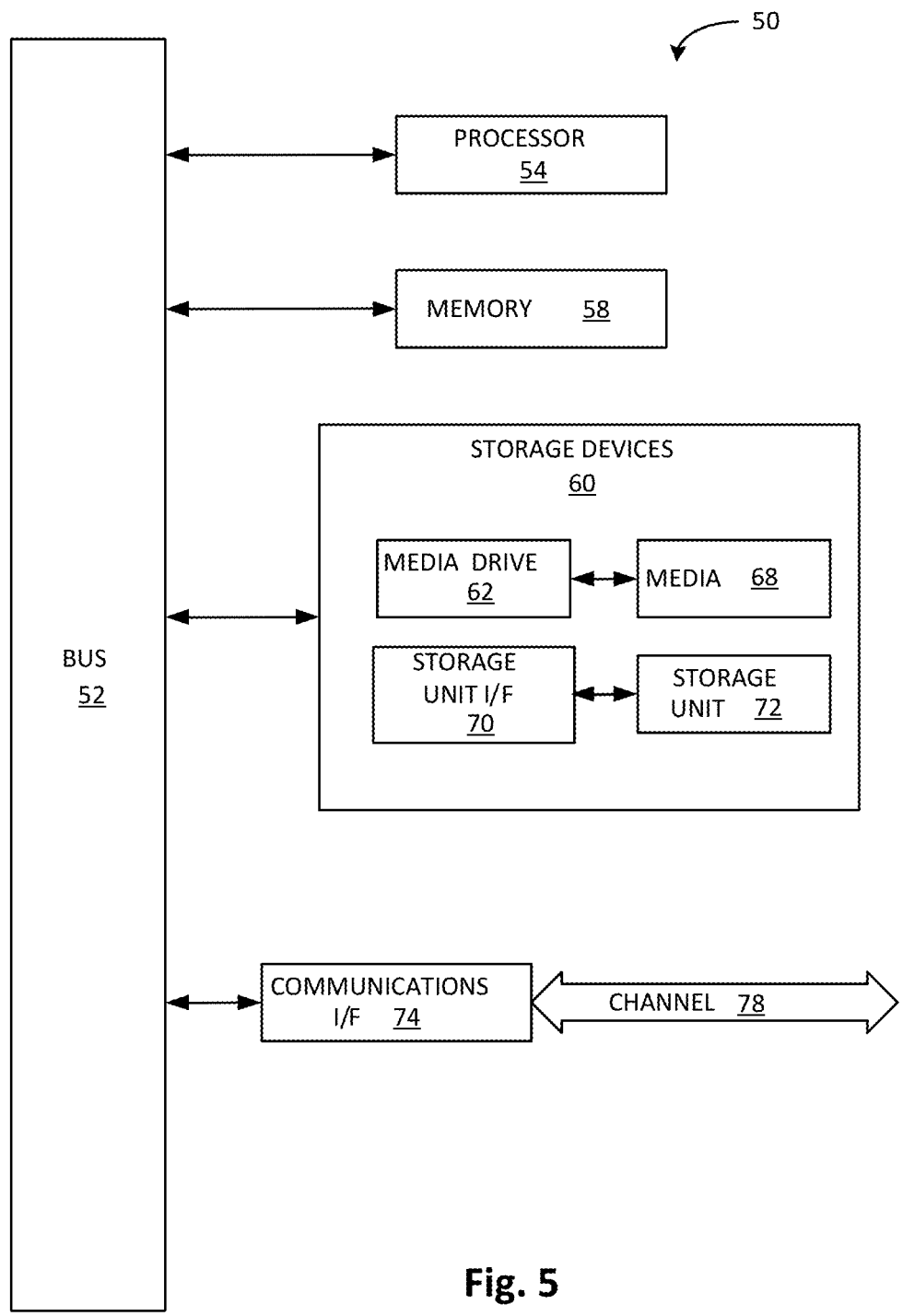
FIG. 5 depicts in a block diagram a computer apparatus for the FIG. 3 method and apparatus.

FIG. 5 shows further detail of the FIG. 4 computing apparatus in one embodiment. FIG. 5 illustrates a typical and conventional computing system 50 that may be employed to implement processing functionality in embodiments of the invention and shows additional detail of the FIG. 4 system. Computing systems of this type may be used in a computer server or user (client) computer or other computing device, for example or be part of the scanner apparatus. Those skilled in the relevant art will also recognize how to implement embodiments of the invention using other computer systems or architectures. Computing system 50 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 50 can include one or more processors, such as a processor 54. Processor 54 can be implemented using a general or special purpose processing engine such as, for example, a microprocessor, microcontroller or other control logic. In this example, processor 54 is connected to a bus 52 or other communications medium. Note that in some embodiments the present process is carried out in whole or in part by "hardware" (dedicated circuitry) which is equivalent to the above described software embodiments.

Computing system 50 can also include a main memory 58 (equivalent to memories 36, 43, 48), such as random access memory (RAM) or other dynamic memory, for storing information and instructions to be executed by processor 54. Main memory 58 also may be used for storing temporary variables or other intermediate information during execution of instructions to be executed by processor 54. Computing system 50 may likewise include a read only memory (ROM) or other static storage device coupled to bus 52 for storing static information and instructions for processor 54.

Computing system 50 may also include information storage system 60, which may include, for example, a media drive 72 and a removable storage interface 70. The media drive 72 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 68 may include, for example, a hard disk, floppy disk, magnetic tape, optical disk, CD or DVD, or other fixed or removable medium that is read by and written to by media drive 72. As these examples illustrate, the storage media 68 may include a computer-readable storage medium having stored therein particular computer software or data.

In alternative embodiments, information storage system 60 may include other similar components for allowing computer programs or other instructions or data to be loaded into computing system 50. Such components may include, for example, a removable storage unit 72 and an interface 70, such as a program cartridge and cartridge interface, a removable memory (for example, a flash memory or other removable memory module) and memory slot, and other removable storage units 72 and interfaces 70 that allow software and data to be transferred from the removable storage unit 68 to computing system 50.

Computing system 50 can also include a communications interface 74. Communications interface 74 can be used to allow software and data to be transferred between computing system 50 and external devices. Examples of communications interface 74 can include a modem, a network interface (such as an Ethernet or other network interface card (NIC)), a communications port (such as for example, a USB port), a PCMCIA slot and card, etc. Software and data transferred via communications interface 74 are in the form of signals which can be electronic, electromagnetic, optical or other signals capable of being received by communications interface 74. These signals are provided to communications interface 74 via a channel 78. This channel 78 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 58, storage device 68, or storage unit 72. These and other forms of computer-readable media may store one or more instructions for use by processor 54, to cause the processor to perform specified operations. Such instructions, generally referred to as "computer program code" (which may be grouped in the form of computer programs or other groupings), when executed, enable the computing system 50 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 50 using, for example, removable storage drive 68, drive 72 or communications interface 74. The control logic (in this example, software instructions or computer program code), when executed by the processor 54, causes the processor 54 to perform the functions of embodiments of the invention as described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A computer enabled method of depicting an image, comprising:
   receiving from a computer readable memory a volumetric data-set generated from a scan of a 3 dimensional object, wherein the data-set includes a plurality of elements;
   receiving from a second computer readable memory a transfer function which defines a color for each of the elements;
   accumulating the color of the elements using volume rendering in a local region of each vertex of a polygonal object;
   mapping, by a processor, red-green-blue color (RGB) result to each vertex of the polygonal object interfacing with the elements of the volumetric data-set;
   displaying the mapped result of the color mapped polygonal object;
   displaying a depiction of the transfer function including a plurality of control points; and
   receiving input from a user at each control point to select a value of a parameter for a portion of a projection associated with that control point.

2. The method of claim 1, further comprising interpolating the color of vertices upon the surfaces of correspondent triangles of the polygonal object.

3. The method of claim 1, further comprising receiving user input for establishing for the transfer function a relation of the value of volumetric data and the correspondent color mapped to the vertices of the polygonal object data.

4. The method of claim 1, wherein the volumetric data-set is generated from performing one of:
   volumetric ray-tracing, volumetric ray-casting, splatting, shear warping, and texture mapping.

5. The method of claim 1, wherein the transfer function is one of:
   a ramp function, a piecewise linear function, and a lookup table.

6. A computing device programmed to carry out the method of claim 1.

7. A non-transitory computer readable storage medium storing computer code to carry out the method of claim 1.

8. Apparatus for depicting an image, comprising:
   a first computer readable storage which stores a volumetric data-set generated from a scan of a 3 dimensional object, wherein the data-set includes a plurality of elements;
   a second computer readable storage which stores a transfer function which defines a color for each of the elements;
   a processor coupled to the first and second storages and which accumulates the color of the elements using volume rendering in a local region of each vertex of a polygonal object, maps the color of the elements to the vertices of a polygonal object interfacing with the elements of the volumetric data-set, and causes the display of the mapped result of the color mapped polygonal object; and
   a graphical user interface for displaying a depiction of the transfer function including a plurality of user manipulatable control points.

9. The apparatus of claim 8, wherein the color of the vertices is interpolated upon the surfaces of correspondent triangles of the polygonal object.

10. The apparatus of claim 8, further comprising receiving user input for establishing for the transfer function a relation of the value of volumetric data and the correspondent color mapped to the vertices of the object.

11. The apparatus of claim 8, wherein the volumetric data-set is generated by performing one of:
   volumetric ray-tracing, volumetric ray-casting, splatting, shear warping, and texture mapping.

12. The apparatus of claim 8, wherein the transfer function is one of:
   a ramp function, a piecewise linear function, and a look-up table.

13. The apparatus of claim 8, further comprising:
   the processor displaying a depiction of the transfer function including a plurality of control points; and
   receiving input from a user at each control point to select a value of a parameter for a portion of the mapped colors associated with that control point.

* * * * *